United States Patent
Chung et al.

(10) Patent No.: US 7,888,824 B2
(45) Date of Patent: Feb. 15, 2011

(54) INDEPENDENT POWER SUPPLY MODULE FOR LCD

(75) Inventors: Wei-Wen Chung, Taoyuan County (TW); Chi-Hsiu Lin, Yun-Lin Hsien (TW); Ming-Chang Lin, Tainan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 202 days.

(21) Appl. No.: 12/412,363

(22) Filed: Mar. 27, 2009

(65) Prior Publication Data

US 2010/0176656 A1    Jul. 15, 2010

(30) Foreign Application Priority Data

Jan. 9, 2009    (TW)    ............................... 98100774 A

(51) Int. Cl.
  *G05F 3/06*    (2006.01)

(52) U.S. Cl. ...................................... 307/151
(58) Field of Classification Search ................... 307/151
  See application file for complete search history.

(56) References Cited

U.S. PATENT DOCUMENTS

2005/0013143 A1*    1/2005    Kim et al. ..................... 363/20

\* cited by examiner

*Primary Examiner*—Robert L. Deberadinis
(74) *Attorney, Agent, or Firm*—Winston Hsu; Scott Margo

(57) ABSTRACT

A power supply module for an LCD includes a system power supply module and a backlight power supply module. The system power supply module is used to drive a display panel module of the LCD. The backlight power supply module utilizes a power factor correction device to convert an input AC voltage to a DC voltage, and then utilizes a DC/AC inverter to convert the DC voltage to an AC driving voltage to drive the backlight module. The power supply module is also applicable to a plurality of LCDs.

10 Claims, 4 Drawing Sheets

INDEPENDENT POWER SUPPLY MODULE FOR LCD

BACKGROUND OF THE INVENTION

1. Field of the Invention

The present invention relates to a power supply module of a Liquid Crystal Display (LCD), and more particularly, to a power supply module which separates the backlight power supply module and the system power supply module applied to an LCD.

2. Description of the Prior Art

Please refer to FIG. 1. FIG. 1 is a diagram illustrating a conventional power supply module of an LCD. The LCD comprises a display panel module 140 and a backlight module 150. The backlight module comprises a plurality of Cold Cathode Fluorescent Lamps (CCFLs). The power supply module of the LCD comprises a system power supply 120 and a DC/AC inverter 130. The system power supply 120 comprises a Power Factor Corrector (PFC) 121, a DC/DC converter 122, and a DC/DC converting module 123. The DC/DC converter 122 and the DC/DC converting module 123 are electrically connected to the PFC 121. The PFC 121 receives an AC input voltage $V_{AC}$ and accordingly generates a DC voltage $V_{DC}$. The DC/DC converting module 123 comprises a 3.3V DC/DC converter 1231, a 5V DC/DC converter 1232, and a 12V DC/DC converter 1233. Thus, the DC/DC converting module 123 generates DC voltages required by the display panel module 140 according to the DC voltage $V_{DC}$. Generally, the voltages required by the display panel module 140 are 3.3V, 5V, and 12V. The DC/DC converting module 123 generates the corresponding voltages according to the requirement of the display panel module 140. The DC/AC inverter 130 is electrically connected to the DC/DC converter 122 for generating an AC drive voltage $V_{AC\_DRIVE}$ so as to drive the backlight module 150. Since the DC/AC inverter 130 uses DC 24V as input, the system power supply 120 converts the DC voltage $V_{DC}$ to DC 24V by the DC/DC converter 122 for providing to the DC/AC inverter 130 as required. However, the two-time DC voltage converting causes the reduction of the power efficiency.

The system power supply 120 provides DC voltages required by the display panel module 140. Generally, the voltages required by the display panel module 140 are 3.3V, 5V, and 12V. The DC/AC inverter 130 provides the AC voltage $V_{AC\_DRIVE}$ required by the backlight module 150. However, in the prior art, since the 24V used by the DC/AC converter 130 is generated from the DC/DC converter 122 of the system power supply 120, the power for driving both of the display panel module 140 and the backlight module 150 has to be converted by the system power supply 120. Consequently, the design of the system power supply 120 is limited to the requirement of the backlight module 150, and the power design of the backlight module 150 is also limited to the system power supply 120. In other words, when a user designs the system power supply and the backlight module, the user not only has to consider the power consumption of each of the system power supply and the backlight module, but also has to consider the match of the system power supply and the backlight module, which increases the complexity of the design.

SUMMARY OF THE INVENTION

The present invention provides a power supply module for a Liquid Crystal Display (LCD). The LCD has a display panel module, a backlight module, and a system circuit. The power supply module comprises a backlight power supply module, comprising a Power Factor Corrector (PFC) for converting a first AC voltage to a first DC voltage; and a DC/AC inverter, electrically connected to the backlight module, for converting the first DC voltage to a second AC voltage; and a system power supply module, comprising an AC/DC rectifier, for converting the first AC voltage to a second DC voltage; and a DC/DC converting module, electrically connected to the system circuit, for converting the second DC voltage to a third voltage.

The present invention further provides a power supply module for an LCD. The LCD has a first and a second display panel modules, a first and a second backlight modules, a first and a second system circuits. The power supply module comprises a first backlight power supply module, comprising a first PFC, for converting a first AC voltage to a first DC voltage; and a first DC/AC inverter, electrically connected to the first backlight module, for converting the first DC voltage to a second AC voltage; a second backlight power supply module, comprising a second PFC, for converting the first AC voltage to a second DC voltage; and a second DC/AC inverter, electrically connected to the second backlight module, for converting the second DC voltage to a third AC voltage; and a system power supply module, comprising an AC/DC rectifier, for converting the first AC voltage to a third DC voltage; and a DC/DC converting module, electrically connected to the first and the second system circuit, for converting the third DC voltage to a fourth DC voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
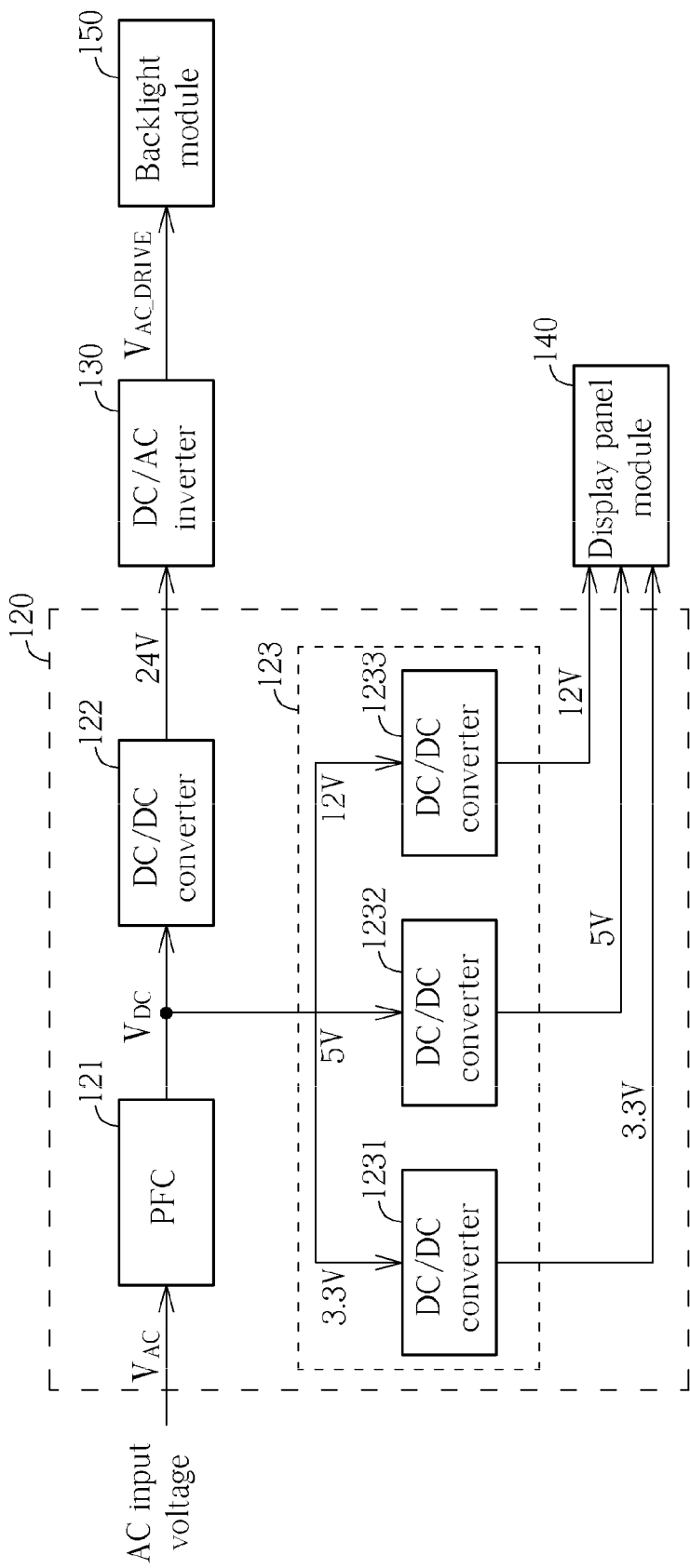
FIG. 1 is a diagram illustrating a conventional power supply module of an LCD.
Figure 2:
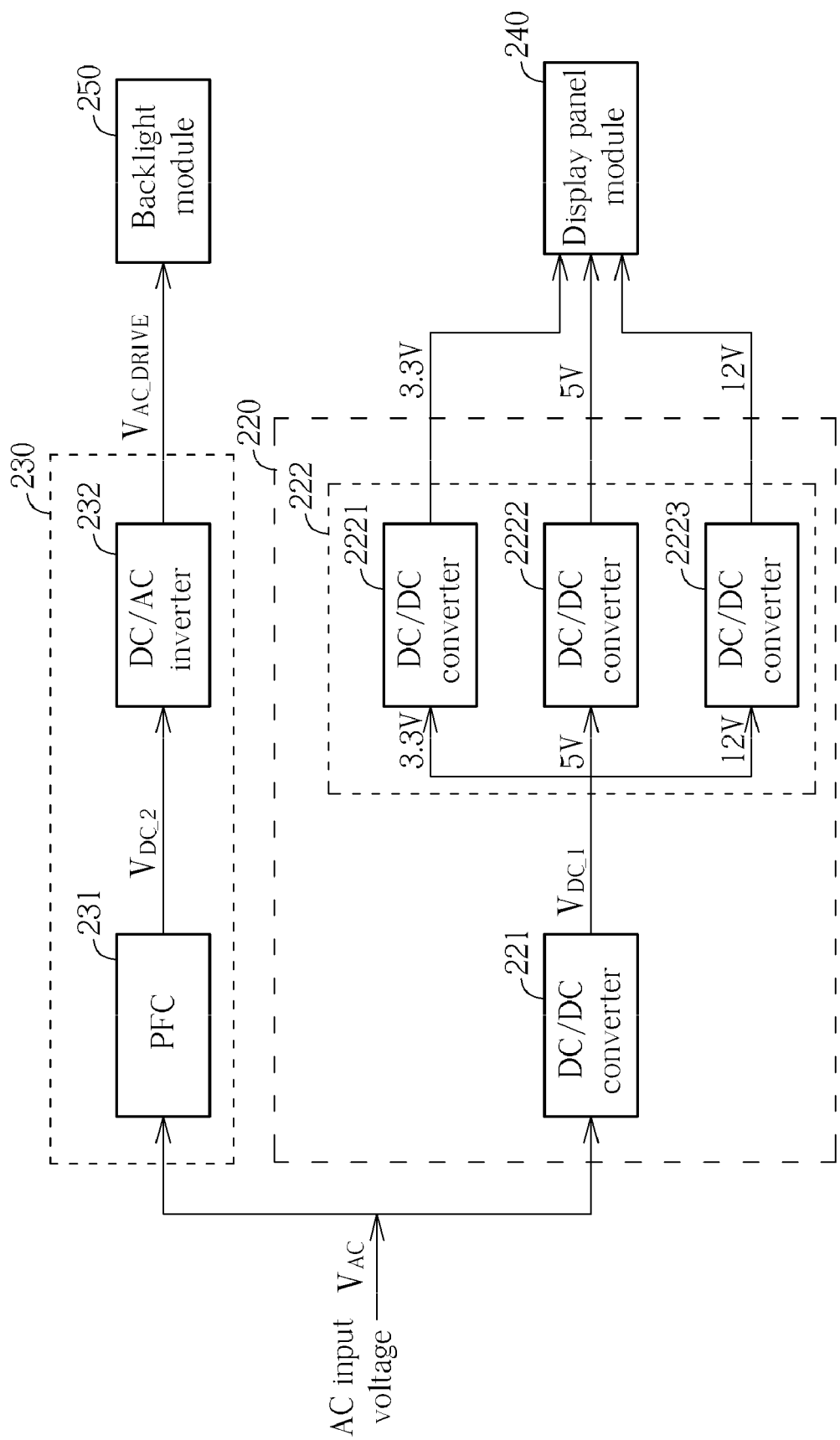
FIG. 2 is a diagram illustrating the power supply module of an LCD according to a first embodiment of the present invention.

Please refer to FIG. 2. FIG. 2 is a diagram illustrating the power supply module of an LCD according to a first embodiment of the present invention. The power supply module comprises a system power supply module 220 and a backlight power supply module 230. The LCD comprises a display panel 240 and a backlight module 250. The backlight module 250 comprises a plurality of CCFLs. The system power supply module 220 converts an AC input voltage $V_{AC}$ to DC voltages required by the display panel module 240. Generally, the DC voltages required by the display panel module 240 are 3.3V, 5V, and 12V. The system power supply module 220 comprises an AC/DC rectifier 221 and a DC/DC converting module 222. The AC/DC rectifier 221 converts the AC input voltage $V_{AC}$ to a DC voltage $V_{DC\_1}$. The DC/DC converting module 222 is electrically connected to the AC/DC rectifier 221 and comprises a 3.3V DC/DC converter 2221, a 5V DC/DC converter 2222, and a 12V DC/DC converter 2223. Thus, the DC/DC converting module 222 is capable of generating the DC voltages required by the display panel module 240 according to the DC voltage $V_{DC\_1}$. Generally, the DC voltages required by the display panel module 240 are 3.3V, 5V, and 12V. The DC/DC converting module 222 generates the corresponding voltages according to the requirement of the display panel module 240.

The backlight power supply module 230 comprises a PFC 231 and a DC/AC inverter 232. The PFC 231 converts the AC input voltage $V_{AC}$ to a DC voltage $V_{DC\_2}$ and corrects the power factor of the AC input voltage $V_{AC}$. The DC/AC inverter 232 is electrically connected to the PFC 231 for converting the DC voltage $V_{DC\_2}$ to an AC drive voltage $V_{AC\_DRIVE}$ so as to drive the backlight module 250. In the present embodiment, the backlight power supply module 230 provides the voltages required by the backlight module 250, and the backlight power supply module 230 utilizes the PFC 231 to converts the AC input voltage $V_{AC}$ to the DC voltage $V_{DC\_2}$; the system power supply module 220 provides the DC voltages required by the display panel module 240, and the system power supply module 220 utilizes the AC/DC rectifier 221 to convert the AC input voltage $V_{AC}$ to the DC voltage $V_{DC\_1}$. In this way, the backlight power supply module 230 and the system power supply module 220 can independently convert AC voltages to DC voltages.

When a user designs the system power supply of the present invention, he does not have to consider the power consumption of the backlight module, and vice versa. In other words, the system power supply module and the backlight module can be designed independently without consideration of matching their specifications. Furthermore, since the consideration of the power required by the backlight module does not have to put in the design of the system power supply module, the power specification of the system power supply module can be greatly reduced. Thus, the system power supply module only has to utilize the AC/DC rectifier to convert the AC input voltage to the DC voltage and does not utilize the PFC to correct the power factor of the AC input voltage.

Figure 3:
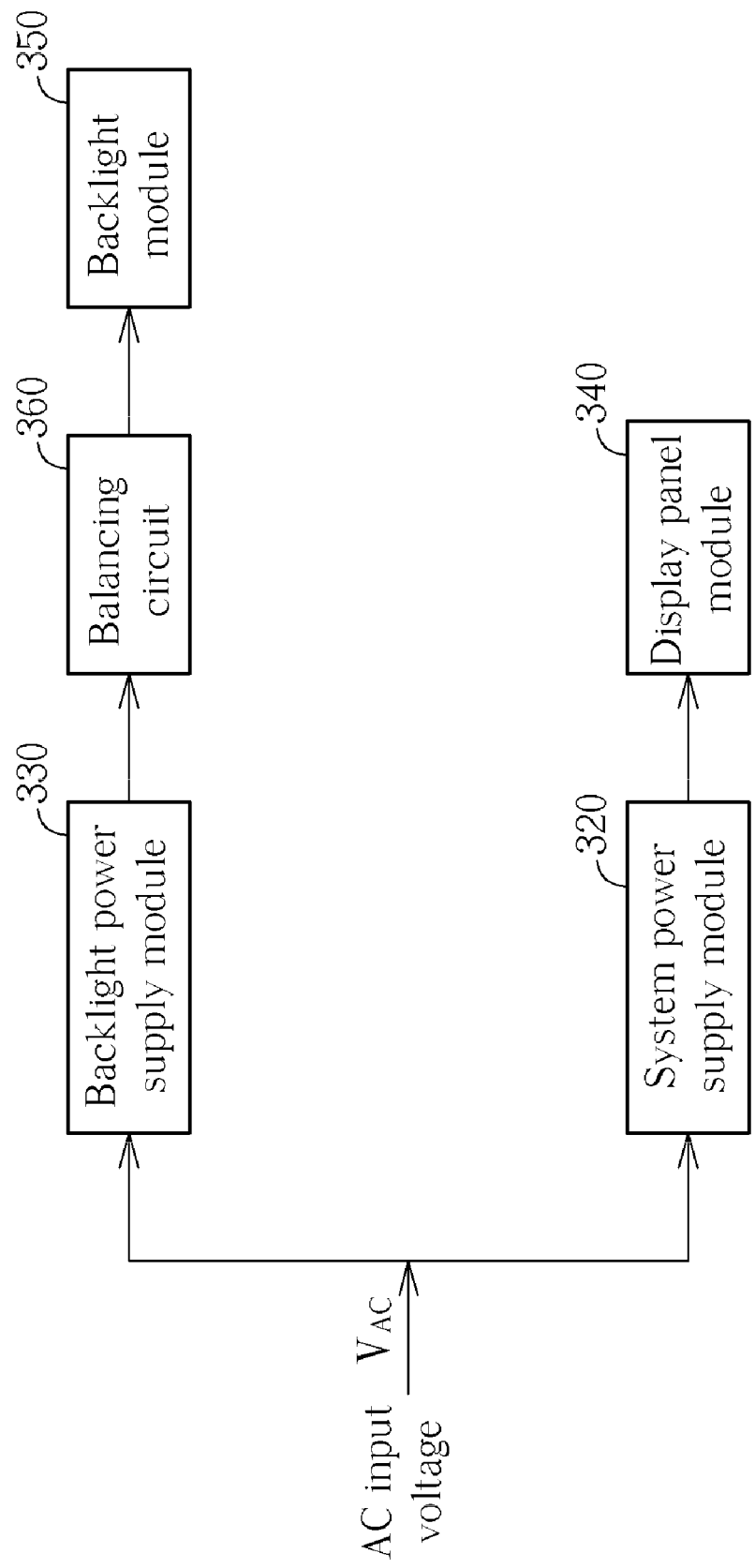
FIG. 3 is a diagram illustrating the power supply module of an LCD according to a second embodiment of the present invention.

Please refer to FIG. 3. FIG. 3 is a diagram illustrating the power supply module of an LCD according to a second embodiment of the present invention. The LCD comprises a display panel module 340 and a backlight module 350. The power supply module comprises a system power supply module 320, a backlight power supply module 330, and a balancing circuit 360. The backlight module 350 comprises a plurality of CCFLs. Since the current flowing through each CCFL is different because of the different impedance of each CCFL and the leakage current caused by the existence of the intrinsic capacitors of the backlight module, the quality of the display is deteriorated. In the present embodiment, the balancing circuit 360 reduces the affection of the impedance and the leakage current by controlling the current difference between each CCFL within an allowable range, which improves the quality of display. As shown in FIG. 3, the balancing circuit 360 is electrically connected to the backlight power supply module 330 and the backlight module 350 for improving the current balance of the backlight module 350. The operational principles and the functions of the system power supply module 320 and the backlight power supply module 330 are similar to those of the first embodiment of the present invention and will not be repeated again for brevity.

Figure 4:
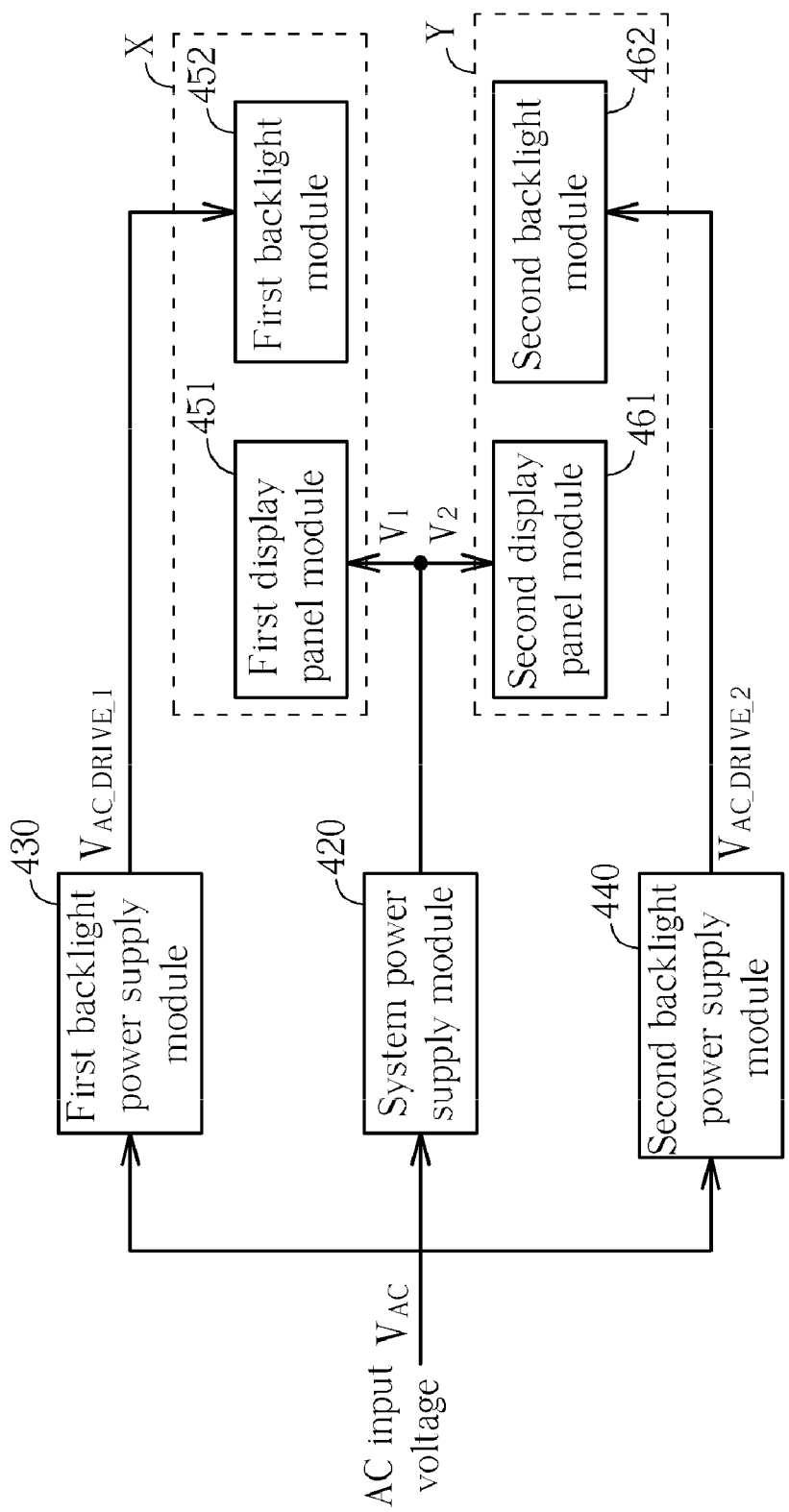
FIG. 4 is a diagram illustrating the power supply module of an LCD according to a third embodiment of the present invention.

Please refer to FIG. 4. FIG. 4 is a diagram illustrating the power supply module of an LCD according to a third embodiment of the present invention. In the present embodiment, the power supply module can provide power to two LCDs as their requirements. The first LCD X comprises a first display panel module 451 and a first backlight module 452. The second LCD Y comprises a second display panel module 461 and a second backlight module 462. The power supply module comprises a system power supply module 420, a first backlight power supply module 430, and a second backlight power supply module 440. As shown in FIG. 4, the first backlight power supply module 430 converts an AC input voltage $V_{AC}$ to an AC drive voltage $V_{AC\_DRIVE\_1}$ for driving the first backlight module 452; the second backlight power supply module 440 converts the AC input voltage $V_{AC}$ to another AC drive voltage $V_{AC\_DRIVE\_2}$ for driving the second backlight module 462. Since the power consumption of the backlight module is much higher than that of the display panel module, the power supply module of the present invention provides power to the backlight module 452 of the LCD X and the backlight module 462 of the LCD Y by the independent backlight power supply modules 430 and 440 respectively, and the display panel modules 451 and 461 share the power provided by the system power supply module 420 of the power supply module of the present invention. The system power supply module 420 converts the AC input voltage $V_{AC}$ to a DC voltage $V_1$ required by the first display panel module 451 and a DC voltage $V_2$ required by the second display panel module 452. The system power supply module 420 generates the corresponding voltages according to the requirements of the first display panel module 451 and the second display panel module 452. For example, the first display panel module 451 and the second display panel module 452 require DC 3.3V, 5V, and 12V, which means the DC voltages $V_1$ and $V_2$ can comprise 3.3V, 5V, and 12V. In this way, the power supply module of the LCD of the present invention is capable of driving a plurality of LCDs. The system power supply module of the present invention and the backlight power supply module of the present invention operate separately. The operational principles and the functions of the system power supply module 420, the first backlight power supply module 430, and the second backlight power supply module 440 are similar to those of the embodiment of FIG. 2, and will not be repeated again for brevity.

To sum up, the present invention provides a power supply module capable of driving one LCD or a plurality of LCDs. The power supply module comprises a system power supply module and a backlight power supply module, wherein the power supply module and the backlight power supply module can be designed independently. The system power supply module is utilized for driving the display panel module of the LCD. The backlight power supply module utilizes a PFC to convert an AC input voltage to a DC voltage, and further utilizes a DC/AC inverter to convert the DC voltage to an AC driving voltage for driving the backlight module of the LCD. Since the consideration of the power required by the backlight module does not have to put in the design of the system power supply module, the power specification of the system power supply module can be greatly reduced, providing great convenience.

Those skilled in the art will readily observe that numerous modifications and alterations of the device and method may be made while retaining the teachings of the invention.

What is claimed is:

1. A power supply module for a Liquid Crystal Display (LCD), the LCD having a display panel module, a backlight module, and a system circuit, the power supply module comprising:
    a backlight power supply module, comprising:
        a Power Factor Corrector (PFC) for converting a first AC voltage to a first DC voltage; and
        a DC/AC inverter, electrically connected to the backlight module, for converting the first DC voltage to a second AC voltage; and
    a system power supply module, comprising:
        an AC/DC rectifier, for converting the first AC voltage to a second DC voltage; and
        a DC/DC converting module, electrically connected to the system circuit, for converting the second DC voltage to a third voltage.

2. The power supply module of claim 1, wherein the DC/DC converting module comprises a 3.3V DC/DC converter, a 5V DC/DC converter, and a 12V DC/DC converter.

3. The power supply module of claim 1, wherein the backlight module comprises at least one Cold Cathode Fluorescent Lamp (CCFL).

4. The power supply module of claim 1, further comprising a balancing circuit, electrically connected between the backlight power supply module and the backlight module.

5. The power supply module of claim 1, wherein the PFC corrects a power factor of the first AC voltage.

6. A power supply module for an LCD, the LCD having a first and a second display panel modules, a first and a second backlight modules, a first and a second system circuits, the power supply module comprising:
    a first backlight power supply module, comprising:
        a first PFC, for converting a first AC voltage to a first DC voltage; and
        a first DC/AC inverter, electrically connected to the first backlight module, for converting the first DC voltage to a second AC voltage;
    a second backlight power supply module, comprising:
        a second PFC, for converting the first AC voltage to a second DC voltage; and
        a second DC/AC inverter, electrically connected to the second backlight module, for converting the second DC voltage to a third AC voltage; and
    a system power supply module, comprising:
        an AC/DC rectifier, for converting the first AC voltage to a third DC voltage; and
        a DC/DC converting module, electrically connected to the first and the second system circuit, for converting the third DC voltage to a fourth DC voltage.

7. The power supply module of claim 6, wherein the DC/DC converting module comprises a 3.3V DC/DC converter, a 5V DC/DC converter, and a 12V DC/DC converter.

8. The power supply module of claim 6, wherein power of the first and the second backlight modules can be the same or different.

9. The power supply module of claim 6, wherein the first backlight module comprises at least one CCFL, and the second backlight module comprises at least one CCFL.

10. The power supply module of claim 6, further comprising:
    a first balancing circuit, electrically connected between the first backlight power supply module and the first backlight module; and
    a second balancing circuit, electrically connected between the second backlight power supply module and the second backlight module.

* * * * *